United States Patent Office 3,047,364
Patented July 31, 1962

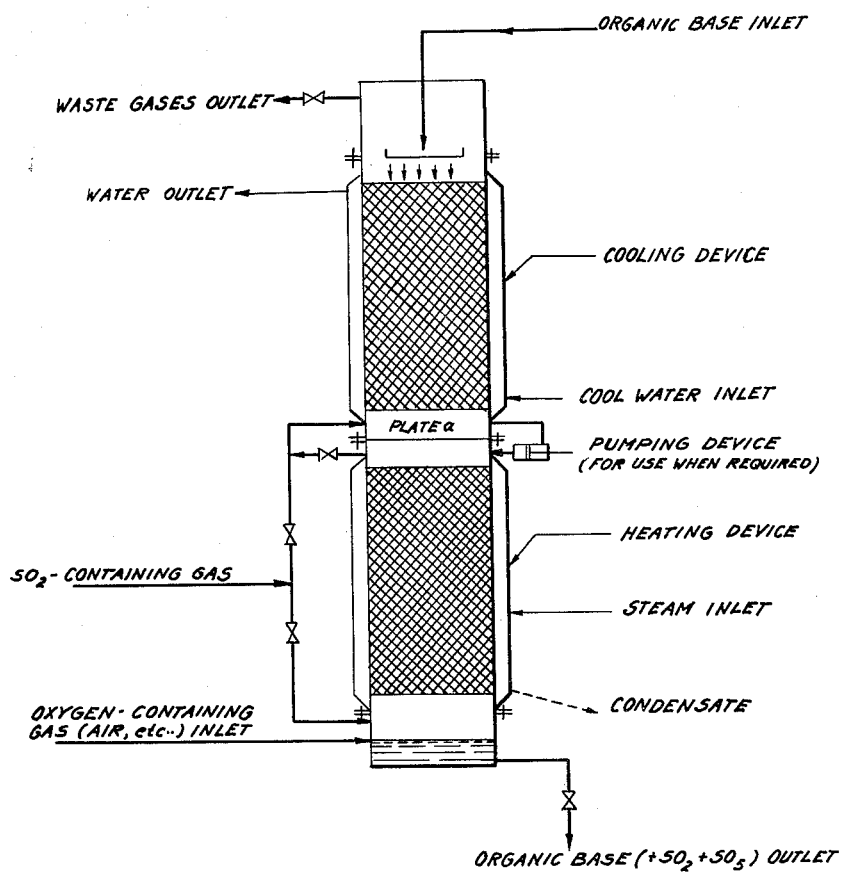

3,047,364
SULFUR DIOXIDE RECOVERY FROM GASES
EMPLOYING ORGANIC BASES
Angel Vian-Ortuño, Madrid, Spain, assignor to Instituto
Nacional de Industria, Madrid, Spain
Filed Apr. 13, 1959, Ser. No. 805,973
Claims priority, application Spain Apr. 12, 1958
7 Claims. (Cl. 23—178)

The present invention relates to a process for the recovery of sulfur dioxide, and more particularly it relates to a process wherein sulfur dioxide is to be absorbed by an organic base.

It is frequently required to remove sulfur dioxide from industrial gases either in order to utilize the sulfur dioxide, or in order to reduce the sulfur dioxide content of the waste gases so that the same may be released into the atmosphere.

The removal of sulfur dioxide from gases containing the same is frequently carried out by contacting such gases with an organic base adapted to absorb sulfur dioxide. The absorption capacity of the suitable organic bases has, of course, a definite upper limit as will be more fully described further below. It would be desirable to increase the quantity of sulfur dioxide which can be removed from gases containing the same with a given quantity of the absorbent organic base, since operating costs and investment in plant and equipment could be considerably reduced if per given quantity of organic base a larger quantity of sulfur dioxide could be removed from the gas.

It is therefore an object of the present invention to provide a process for the removal of sulfur dioxide from gases containing the same which can be carried out in a more economical manner than was hitherto possible.

It is another object of the present invention to provide a process for the removal of sulfur dioxide from gases containing the same and for the recovery of the thus removed sulfur dioxide in the form of pure sulfur dioxide and of sulfates which process can be carried out in a simple and economical manner.

It is a further object of the present invention to provide a process for the removal of sulfur dioxide from a gaseous mixture containing the same which process will be highly selective so that only sulfur dioxide will be removed from the gaseous mixture.

Other objects and advantages of the present invention will become apparent from a further reading of the description and of the appended claims.

With the above and other objects in view, the present invention contemplates a process for the recovery of sulfur dioxide from gases containing the same, comprising the steps of contacting a sulfur dioxide containing gas with an organic base adapted to absorb sulfur dioxide so as to absorb at least the major portion of the sulfur dioxide contained in the gas, oxidizing at least a portion of the thus absorbed sulfur dioxide to sulfur trioxide, separating the sulfur oxides containing organic base, and recovering sulfur dioxide therefrom, whereby due to the oxidation of at least a portion of the absorbed sulfur dioxide to sulfur trioxide the capacity of the organic base to absorb sulfur dioxide is increased.

According to one preferred mode of carrying out the process of the present invention, the same comprises the steps of contacting an organic base adapted to absorb sulfur dioxide in countercurrent flow and at a first predetermined temperature with a gas containing sulfur dioxide so as to absorb at least the major portion of the sulfur dioxide, the organic base being selected from the group consisting of xylidine, toluidine, quinoline, dimethylaniline, heavy pyridic bases from coal tar, methylamine and ethanolamines, contacting the sulfur dioxide-containing organic base at a second temperature being between 70 and 90° C. and being higher than the first predetermined temperature and at an absolute pressure of between 2 and 5 atmospheres with an oxygen-containing gas so as to oxidize at least a portion of the absorbed sulfur dioxide to sulfur trioxide, thereby increasing the capacity of the organic base to absorb sulfur dioxide, recovering sulfur dioxide from the organic base, sulfur trioxide being retained by the same, reacting the sulfur trioxide-containing organic base with a stronger base so as to form the sulfate of the stronger base, and separating the sulfate of the stronger base from the organic base.

Thus, according to the present invention, a controlled partial oxidation of the absorbed sulfur dioxide to sulfur trioxide is carried out by the introduction of oxygen containing gas and preferably by increasing pressure and temperature in order to achieve the desired degree of oxidation. By changing the absorbed sulfur oxide from the sulfurous form to the sulfuric form, the absorption equilibrium moves to the liquid side, in other words, a greater quantity of sulfur dioxide can be absorbed by the liquid organic base.

Thus, it is possible according to the present invention to work up gases having a relatively low partial sulfur dioxide pressure; to operate at higher temperatures than could be effectively used without oxidation of a part of the absorbed sulfur dioxide; and to prevent absorption of gases other than sulfur dioxide. Due to the improved selectivity of the absorption, i.e. the absorption of substantially only sulfur dioxide, the purity of the recovered sulfur dioxide is also improved.

The fact that according to the present invention it is possible to work up gases containing relatively small quantities of sulfur dioxide, i.e. having a relatively small partial pressure of sulfur dioxide, is of considerable practical importance, since thereby the field of application of the conventional absorbents, generally organic bases, is broadened to include the absorption of sulfurous gases of higher degree of dilution. Furthermore, according to the present invention absorbents can be used which have a relatively small absorption capacity so that the same could not be utilized in accordance with conventional processes which fail to oxidize part of the absorbed sulfur dioxide.

Due to the fact that the absorption can now take place at higher temperatures, the process of the present invention can be carried out in a single absorption tower equipped with a very small cooling device and possibly the process according to the present invention may even be carried out without cooling due to the fact that the absorption reaction per se is an exothermic reaction. Obviously, it is also of great importance that according to the present invention sulfur dioxide of greater purity will be recovered.

In fact, in those cases where crude gases may carry some $CO_2$ together with $SO_2$, as flue gases do, for example, or those others generated in the roasting of carbonaceous pyrites, or gases generated by the decomposition of calcium sulfate in coal-heated rotary kilns, a certain amount of carbon dioxide will be absorbed together with sulfur dioxide, and when the desorption takes place, both $SO_2$ and $CO_2$ fume off out of the liquid, thus the resulting sulfur dioxide is impurified and this causes difficulties mainly in such cases where the sulfur dioxide is then to be liquefied. When, according to the present invention, a considerable portion of the absorbed sulfur dioxide is oxidized, the capacity of the organic base or the like to absorb and hold carbon dioxide is reduced, the carbon dioxide absorbent compound becoming unstable so that $CO_2$ fumes off in the same process and the base is thus recovered. Thereafter the base will be saturated by $SO_2$, as wanted, i.e. the absorbent capacity of organic bases is increased whereas the produced $SO_2$ is not impurified.

It must be emphasized that by absorbing according to the present invention, the sulfur dioxide which is contained in industrial gases such as roasting gases, chimney gases, converter gases, etc., by means of an organic absorbent and in such a manner that after absorption of the sulfur dioxide the same is partially oxidized to sulfur trioxide, additional sulfur dioxide can then be absorbed by the same organic absorbent base. The entire process according to the present invention preferably will take place in a single absorption tower. Due to the reversibility of the process:

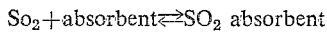

$$So_2 + \text{absorbent} \rightleftarrows SO_2 \text{ absorbent}$$

and of the non-reversibility of the process:

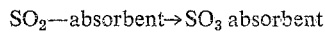

$$SO_2 - \text{absorbent} \rightarrow SO_3 \text{ absorbent}$$

so that $SO_2$ may be desorbed but $SO_3$ may not, the performance in the tower may be carried out at higher temperature and lower pressure.

Other gases which may accompany sulfur dioxide and which also may be absorbed by the organic base, primarily carbon dioxide, cannot be oxidized in this manner, and thus the selective capacity of the absorbent in favor of sulfur dioxide will be increased. The oxidation of sulfur dioxide to sulfur trioxide always takes place in the dissolved or absorbed phase and not in the gaseous sulfur dioxide phase.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing in which the figure is a schematic elevational cross section through an apparatus suitable for carrying out the process of the present invention.

Referring now to the drawing, an absorption tower is shown consisting essentially of two superposed sections. Organic base is introduced at the top of the tower and passes through the same downwardly absorbing sulfur dioxide which is partially oxidized to sulfur trioxide, so that an organic base including sulfur dioxide and sulfur trioxide leaves the bottom portion of the tower. The sulfur dioxide containing gas is introduced into the lower portion of the lower section and into the lower portion of the upper section of the tower. The lower section of the tower is provided with heating means and the upper section of the tower with cooling means. An oxygen-containing gas such as air or oxygen enriched air or even pure oxygen is introduced into the lowermost portion of the tower and passes upwardly through the same concurrently with the sulfur dioxide-containing gas and in countercurrent flow with the organic base. Waste gases are removed through the top of the tower. In order to better control the pressure differential between the upper and the lower section of the tower, the sections may be separated by a horizontal plate, and a conduit is provided circumventing the horizontal plate and including a pumping device for maintaining the desired degree of higher pressure in the lower section of the tower. It can easily be seen that the organic base passing through the upper section of the tower will absorb sulfur dioxide, and when passing through the lower section of the tower which lower section is maintained at higher temperature and pressure than the upper section, a portion of the absorbed sulfur dioxide will be oxidized in contact with the oxygen-containing gas so as to form sulfur trioxide. Thereby, the downwardly flowing base in the lower section of the tower will be capable of absorbing additional sulfur dioxide while simultaneously any other gases which may have been absorbed during the passage of the base through the upper section of the tower, such as carbon dioxide, will be released during the passage of the organic base through the lower heated section of the tower. Thus, the organic base leaving the bottom of the tower will contain absorbed sulfur dioxide and sulfur trioxide, but will be substantially free of carbon dioxide or any other constituents of the gases passing upwardly through the tower. Thus, substantially pure sulfur dioxide can be recovered from the organic base leaving the absorption tower.

Thus, absorption towers, packed towers or bubbling plates can be fed through the top with absorbent bases (coal-tar bases, dimethylanilin, xylidine, etc.), with the addition of whatever amount of water inasmuch as to permit the system to be monophasic in order to avoid the necessity of stirring devices which would involve additional complications for the practical performance of the process. The sulfurous gases, from which the sulfur dioxide is retained by the organic base together with part of the $CO_2$ occasionally accompanying it, are fed at least partly into the tower through the midst of it. The upper zone of the tower is cooled with water in order to reduce the loss of organic bases being dragged with the waste gases. Air or oxygen is injected through the bottom of the tower, which oxides the organic base sulfite compound to organic base sulfate in an adequate amount, thus reducing the pH of the liquid, liberating the $CO_2$ from its combination with the organic base and forcing it to escape upwardly. The lower zone of the tower, to the contrary, is not cooled, but heated with steam in order to maintain therein a temperature of between 30–150° C., unless the heat developed in the reaction is sufficient to reach the desired temperature. Once the continuous performance period is reached, the gases escaping through the top of the tower carry the inert components (nitrogen, etc.) and $CO_2$, whereas from the bottom of the tower a liquid is recovered, which consists essentially of the absorbent base and which presents a $SO_2/SO_3$ ratio (both $SO_2$ and $SO_3$ combined with the bases), which varies between any desired limits. The ratio of $SO_2:SO_3$ will be lower or higher according to the lower or higher temperature at which the contact between $SO_2$-containing organic base and air or oxygen will take place in the lower section of the tower. Furthermore, the lower half of the tower can be so constructed as to allow operation at pressures of 1 to 10 absolute atmospheres, in which case, with increasing pressure progressively lower temperatures will be required to obtain any desired ratio.

The organic base containing sulfur dioxide and sulfur trioxide which leaves the absorption tower is then freed of the absorbed sulfur dioxide by being subjected to heat and reduced pressure, in a manner well known in the art. There remains an organic base which still contains sulfur trioxide, and the same is decomposed with water, ammonia or potassium hydroxide, etc. so as to obtain diluted sulfuric acid or ammonium sulfate or potassium sulfate. If only relatively small quantities of sulfur trioxide are contained in the organic base after sulfur dioxide has been liberated therefrom, the same can also be treated with a suitable calcium compound in order to separate the pure organic base from the sulfur trioxide which then precipitates in the form of calcium sulfate. Generally, the organic base can be freed from sulfur trioxide by any of the methods known therefor in the art. Thus, the organic base is recovered and can be received to the top of the absorption tower for again absorbing sulfur dioxide and having part of the absorbed sulfur dioxide oxidized to sulfur trioxide in accordance with the present invention.

It is desirable to carry out the method of the present invention in an absorption tower or similar device, as described above, in order to permit continuous operation of the process. Furthermore, by using an absorption tower as described, the injection of oxidizing gas can be carried out simultaneously and successively to the two parts of the sulfur dioxide absorptions but separate from the introduction of the sulfur dioxide containing gas. The degree of oxidation desired and the relative flow rates of the liquids and gases within the apparatus depends on the specific reactants and on the desired end result. They also depend to some extent on the specific construction of the tower, i.e. on the degree of contact between the reactants which is provided within the tower.

The oxygen containing gas which is introduced into the lower portion of the lower section of the absorption tower, for instance, may be air, oxygen-enriched air, or substantially pure oxygen. The type of gas which is to be preferably used depends on the specific operating conditions and the quantity of oxygen, also on the relative and absolute amount of bound sulfur dioxide which is to be oxidized to sulfur trioxide.

The following list of organic bases which can be used for absorbing sulfur dioxide according to the present invention is given as illustrative only, the invention, however, not being limited to the examples of preferred organic bases given below:

Xylidine
Toluidine
Quinoline
Dimethylaniline
Heavy pyridic bases from coal tar
Methylamine
Ethanolamines (diethanolamine in particular)

To the extent that suitable organic bases are missible with each other the same can also be used as mixtures.

It has been found advantageous to carry out the oxidation of the bound sulfur dioxide in the lower section of the absorption tower within a temperature range of between 30 and 150° C. and at an absolute pressure of between 1 and 10 atmospheres. Preferably, the oxidation is carried out at a temperature of between 70 and 90° C. and at a pressure of between 2 and 5 atmospheres.

In the following examples, specific quantities of the various reactants are given. These quantities of the starting material may be introduced into the reaction tower within a unit of time. The length of such time units will depend on the capacity of the plant, however, in the present examples is to to be understood that the reactants are introduced within a period of one hour.

The following examples are given as illustrative only of the present invention, the invention, however, not being limited to the specific details of the examples.

*Example 1*

1000 normal m.³ of a combustion gas having a volumetrical composition of 0.8% $SO_2$, 0.2% CO, 12% $CO_2$, 7% $O_2$, 80% $N_2$ are introduced through the bottom of a tower as shown in the drawing; simultaneously, 115 kg. of dimethylanaline as absorbent base are fed through the top of the tower at 20° C. and normal pressure.

Upon contact, $SO_2$ is absorbed by the organic base (mainly in the upper zone of the tower) and then is partially oxidized to $SO_3$ (mainly in the lower zone of the tower) by the action of an upward stream of air, in an amount of 10 normal m.³, fed through the bottom of the tower.

The liquid base moves towards the lower zone of the tower, where it is compressed up to 2.5 abs. atm. and subjected to a temperature of 75° C. In this way, some of the absorbed $SO_2$ (about 5%) is oxidized and all of the $CO_2$ obsorbed by the base in the upper zone of the tower, is displaced. In this manner, a product is obtained and withdrawn through the bottom of the tower which contains 14.1% $SO_2$ and 0.9% $SO_3$. The liquid base is then heated up to 100° C. at normal pressure, and the $SO_2$ is desorbed. Thereby 18 kg. of pure, technical $SO_2$ gas are produced.

From time to time, the remaining liquid base containing $SO_3$ is treated with lime solution in order to remove $SO_3$ therefrom under formation of calcium sulfate. The thus recovered purified dimethylaniline is again recycled through the tower.

*Example 2*

1000 normal m.³ of a combustion gas composed of 3% $SO_2$, 13.4% $CO_2$, 24.5% CO, 59.1% $N_2$ are injected through the midst of a tower, while 600 kg. of xylidine as absorbent liquid are fed into the top of it.

The upper zone of the tower is maintained at a temperature of 20–30° C. and under normal pressure; the lower zone of the tower is maintained at a temperature of 100° C. and at a pressure of 8 abs. atm. An amount of 20 normal m.³ of air is fed through the bottom of the tower.

The recovered liquid in the bottom of the tower (which liquid is completely free of $CO_2$), contains 9.6% $SO_2$ and 0.7% $SO_3$; the $SO_2$ gas is then desorbed and 64 kg. of technical pure $SO_2$ are thus produced.

The remaining liquid is treated as shown in the preceding example, and the recovered absorbent base is recycled.

*Example 3*

100 normal m.³ of roasting gases having a volumetric composition of 12% $SO_2$, 4% $O_2$, 84% $N_2$ are introduced into the tower through the midst of it, and contact 150 kg. of an absorbent liquid, fed through the top of the tower, which is composed of pyridic bases (with 15% water). Simultaneously, 30 normal m.³ of air are injected through the bottom of the tower. A temperature of 60° C. and a pressure of 2 abs. atm. are maintained in the tower.

Through the bottom of the tower, a liquid is taken off including 13.8% of absorbed $SO_2$ and 5.8% of absorbed $SO_3$. This liquid is then heated up to 85° C. and pressure is reduced down to atmospheric pressure. The $SO_2$ is thus desorbed and 25 kg. of technical, pure $SO_2$ are produced.

The liquid remaining after the desorption of $SO_2$ is treated with 20 kg. of sodium sulphate-saturated sodium hydroxide (50%), so that 18 kg. of sodium sulfate are obtained by crystallization.

The thus formed upper liquid layer, which consists essentially of the organic base free of sulfur compounds, is taken for recycling and further use.

*Example 4*

100 normal m.³ of roasting gases whose volumetrical composition is 7% $SO_2$, 11% $O_2$, 82% $N_2$ are introduced into the tower through the midst of it, while 80 kg. of absorbent liquid composed of quinoline (with 12% water) are fed through the top of the tower. Simultaneously 14.5 normal m.³ of air are fed through the bottom of the tower.

In the upper zone of the tower, a temperature of 20–50° C. and a pressure of 1 abs. atm. is maintained, whereas in the lower zone of it, a temperature of 50–80° C. and a pressure of 4 abs. atm. is maintained.

102 kg. of liquid are taken off through the bottom of the tower, which liquid contains 11.2% $SO_2$ and 10.6% $SO_3$. After heating up to 110° C., $SO_2$ is desorbed, and 11.4 kg. of technical, pure $SO_2$ are produced.

The remaining liquid is introduced into a saturator, where by treating with ammonia, 18 kg. of ammonium sulfate are produced, which may be used further, as fertilizer, for example. The recovered organic base is recycled.

*Example 5*

100 normal m.³ of kiln-gas having a volumetric composition of 5.9% $SO_2$, 17.6% $CO_2$, 6.2% $O_2$, 70.3% $N_2$ are fed into the tower through the midst of it, while 90 kg. of pyridine as the absorbent liquid are fed through the top of it.

35 normal m.³ of air are simultaneously injected through the bottom of the tower.

The upper section of the tower is maintained at a temperature of 20–40° C. and a pressure of 1 abs. atm., whereas the lower section thereof is maintained at 80° C. and 5 abs. atm.

A liquid is taken off through the bottom of the tower which contains 6% $SO_2$ and 11% $SO_3$; 6 kg. of technical, pure $SO_2$ are obtained by desorption when the said liquid is heated up to 90° C.

The remaining 108 kg. of liquid are treated with 16 kg. of $CO_3Na_2$ so that 21 kg. of $SO_4Na_2$ are produced.

The recovered organic base is recycled.

*Example 6*

100 normal m.³ of kiln-gases having a volumetrical composition of 2.61% $SO_2$, 0.27% $SO_3$, 0.12% $CO_2$, 17.2% $O_2$, 79.8% $N_2$ are fed into the tower, through the midst of it, while 45 kg. of N,N-dimethyltoluidine are fed through the top and 4 normal m.³ of air are fed through the bottom.

The tower is maintained at normal pressure and a temperature gradient from 20° C. to 50° C. exists inside it.

Through the bottom of the tower a liquid is taken off which contains 13% $SO_2$ and 2.3% $SO_3$. By heating the liquid up to 120° C. 6.5 kg. of technical, pure $SO_2$ are produced by desorption. The remaining 53 kg. of liquid are treated according to any of the methods mentioned in the preceding examples.

The recovered organic base is recycled.

The waste gases which leave the top of the tower in accordance with all of the previous examples will contain all of the constituents of the sulfur dioxide containing gases which were introduced into the tower with the exception of the sulfur dioxide, and also all of the constituents of the oxygen-containing gases with the exception of most of the oxygen thereof. Thus, the waste gases will primarily contain nitrogen, carbon dioxide, carbon monoxide, excess oxygen, and some small residual quantity of sulfur dioxide up to a maximum of about 0.1%. However, the amount of sulfur dioxide in the waste gases can be considerably reduced below 0.1% if desired.

It should be noted that in accordance with the foregoing examples and in accordance with the drawing, the inlet for the sulfur dioxide containing gases may be in the midst of the tower between the upper and lower section thereof, or at the bottom portion of the tower. Thus, the sulfur dioxide containing gases may be introduced either at the midst of the tower or at the bottom of the tower or in part at the midst and in part at the bottom of the tower.

The pH values found inside the tower are between 5.5 and 6 in the upper section or absorption zone and between 5 and 5.5 in the lower section or oxidation zone.

The pumping device and the horizontal plate shown in the drawing between the upper and lower section of the tower need be used only in such cases where specific different pressure values have to be maintained in the two sections of the tower. Frequently, normal pressure drop and other naturally occurring causes suffice to provide the relatively low pressure differences required for proper operation of the tower and described in the preceding examples. Obviously, it is also possible to operate the entire tower at uniform pressure but with a higher temperature in the lower than in the upper section thereof.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A process for the recovery of sulfur dioxide from gases containing the same, comprising the steps of contacting an organic base selected from the group consisting of xylidine, toluidine, quinoline, dimethylaniline, heavy pyridic bases from coal tar, methylamine and ethanolamine with a gas containing sulfur dioxide so as to cause absorption of at least the major portion of said sulfur dioxide by said base; treating said sulfur dioxide containing base with an oxygen-containing gas which is substantially free of sulfur dioxide so as to oxidize a portion of said absorbed sulfur dioxide to sulfur trioxide and to increase the capacity of said base for absorbing additional sulfur dioxide; contacting the thus-treated base with additional sulfur dioxide-containing gas so as to cause absorption of at least the major portion of the thus additionally introduced sulfur dioxide; and recovering absorbed sulfur dioxide from said base.

2. In a continuous process for the recovery of sulfur dioxide from gases containing the same, the steps of contacting an organic base selected from the group consisting of xylidine, toluidine, quinoline, dimethylaniline, heavy pyridic base from coal tar, methylamine and ethanolamine with a gas containing sulfur dioxide so as to cause absorption of at least the major portion of said sulfur dioxide by said base; treating said sulfur dioxide containing base with an oxygen-containing gas which is substantially free of sulfur dioxide so as to oxidize a portion of said absorbed sulfur dioxide to sulfur trioxide and to increase the capacity of said base for absorbing additional sulfur dioxide; contacting the thus-treated base with additional sulfur dioxide-containing gas so as to cause absorption of at least the major portion of said additional sulfur dioxide; recovering said absorbed sulfur dioxide from the base; and contacting the thus substantially sulfur dioxide-free base with subsequent portions of said sulfur dioxide-containing gas.

3. In a continuous process for the recovery of sulfur dioxide from gases containing the same, the steps of contacting an organic base selected from the group consisting of xylidine, toluidine, quinoline, dimethylaniline, heavy pyridic bases from coal tar, methylamine and ethanolamine in countercurrent flow with a gas containing sulfur dioxide so as to cause absorption of at least the major portion of said sulfur dioxide by said base; treating said sulfur dioxide containing base with an oxygen-containing gas which is substantially free of sulfur dioxide so as to oxidize a portion of said absorbed sulfur dioxide to sulfur trioxide and to increase the capacity of said base for absorbing additional sulfur dioxide; contacting the thus-treated base with additional sulfur dioxide-containing gas so as to cause absorption of at least the major portion of said additional sulfur dioxide; recovering the absorbed sulfur dioxide from said base; and contacting the thus substantially sulfur dioxide-free base with subsequent portions of said sulfur dioxide-containing gas.

4. A process for the recovery of sulfur dioxide from gases containing the same, comprising the steps of contacting an organic base selected from the group consisting of xylidine, toluidine, quinoline, dimethylaniline, heavy pyridic bases from coal tar, methylamine and ethanolamine at a first predetermined temperature with a gas containing sulfur dioxide so as to cause absorption of at least the major portion of said sulfur dioxide by said base; treating said sulfur dioxide containing base at a second predetermined temperature being between 30° C. and 150° C. and being higher than said first predetermined temperature with air so as to oxidize a portion of said absorbed sulfur dioxide to sulfur trioxide and to increase the capacity of said base for absorbing additional sulfur dioxide; contacting the thus-treated base with additional sulfur dioxide-containing gas so as to cause absorption of at least the major portion of said additional sulfur dioxide; and recovering the absorbed sulfur dioxide from said base.

5. In a continuous process for the recovery of sulfur dioxide from gases containing the same, the steps of contacting an organic base selected from the group consisting of xylidine, toluidine, quinoline, dimethylaniline, heavy pyridic bases from coal tar, methylamine and ethanolamine in countercurrent flow at a first predetermined temperature not exceeding about 50° C. with a gas containing sulfur dioxide so as to cause absorption of at least the major portion of said sulfur dioxide by said base; treating said sulfur dioxide containing base at a second predetermined temperature being between 30° C. and 150° C. and being higher than said predetermined temperature and at a superatmospheric pressure with air so as to oxidize a portion of said absorbed sulfur dioxide to sulfur trioxide and to increase the capacity of said base for absorbing additional sulfur dioxide; contacting the thus treated organic base with additional sulfur dioxide-containing gas so as to cause absorption of additional sulfur dioxide by said base; recovering absorbed sulfur dioxide from said base; and contacting the thus substantially sulfur dioxide-free base with subsequent portion of said sulfur dioxide containing gas so as to absorb the same.

6. In a continuous process for the recovery of sulfur dioxide from gases containing the same, the steps of contacting an organic base selected from the group consisting of xylidine, toluidine, quinoline, dimethylaniline, heavy pyridic bases from coal tar, methylamine and ethanolamine in countercurrent flow at a first predetermined temperature of the order of 20° C. with a gas containing sulfur dioxide so as to cause absorption of at least the major portion of said sulfur dioxide by said base; treating said sulfur dioxide containing base at a second predetermined temperature being between 30° C. and 150° C. and at an absolute pressure of between 2 and 11 atmospheres with air so as to oxidize a portion of said absorbed sulfur dioxide to sulfur trioxide and to increase the capacity of said base for absorbing additional sulfur dioxide; contacting the thus-treated base with additional sulfur dioxide-containing gas so as to cause absorption of at least the major portion of said additional sulfur dioxide; recovering the absorbed sulfur dioxide from said base; and contacting the thus substantially sulfur dioxide-free base with subsequent portions of said sulfur dioxide-containing gas.

7. A process for the recovery of sulfur dioxide from gases containing the same, comprising the steps of contacting an organic base adapted to absorb sulfur dioxide, in countercurrent flow and at a first predetermined temperature with a gas containing sulfur dioxide so as to absorb at least the major portion of said sulfur dioxide, said organic base being selected from the group consisting of xylidine, toluidine, quinoline, dimethylaniline, heavy pyridic bases from coal tar, methylamine and ethanolamine; treating said sulfur dioxide-containing organic base at a second temperature being between 70° and 90° C. and being higher than said first predetermined temperature and at an absolute pressure of between 2 and 5 atmospheres with an oxygen-containing gas so as to oxidize at least a portion of said absorbed sulfur dioxide to sulfur trioxide, thereby increasing the capacity of said organic base to absorb sulfur dioxide; contacting the thus-treated base with additional sulfur dioxide-containing gas so as to cause absorption of at least the major portion of said additional sulfur dioxide; recovering sulfur dioxide from said organic base so as to substantially free the same of sulfur dioxide while said sulfur trioxide is retained by said base; reacting the sulfur trioxide-containing organic base with a stronger base so as to form the sulfate of said stronger base; separating the sulfate of said stronger base from said organic base; and recycling said organic base so as to contact additional sulfur dioxide-containing gas therewith.

References Cited in the file of this patent

UNITED STATES PATENTS

| | | |
|---|---|---|
| 1,783,901 | Bottoms | Dec. 2, 1930 |
| 2,128,027 | Clark | Aug. 23, 1938 |
| 2,148,971 | Conway | Feb. 28, 1939 |
| 2,186,453 | Gleason et al. | Jan. 9, 1940 |
| 2,251,216 | Woodhouse | July 29, 1941 |
| 2,370,020 | Doumani | Feb. 20, 1945 |
| 2,399,013 | Fleming et al. | Apr. 23, 1946 |
| 2,404,854 | Latchum et al. | July 30, 1946 |

FOREIGN PATENTS

| | | |
|---|---|---|
| 371,880 | Great Britain | Apr. 29, 1932 |
| 480,519 | Great Britain | Feb. 21, 1938 |
| 506,002 | Great Britain | May 19, 1939 |